United States Patent
Lee et al.

(10) Patent No.: US 10,855,394 B1
(45) Date of Patent: Dec. 1, 2020

(54) INTERFERING RADIO AND VEHICLE KEY LOCKER

(71) Applicant: Firstech, LLC, Kent, WA (US)

(72) Inventors: Jason Lee, Bellevue, WA (US); Jason Henry Kaminski, Renton, WA (US); Sin Il Kim, Incheon (KR); In Yong Lee, Incheon (KR)

(73) Assignee: Firstech, LLC, Kent, WA (US)

( * ) Notice: Subject to any disclaimer, the term of this patent is extended or adjusted under 35 U.S.C. 154(b) by 0 days.

(21) Appl. No.: 16/533,426

(22) Filed: Aug. 6, 2019

(51) Int. Cl.
*H04B 5/02* (2006.01)
*H04K 3/00* (2006.01)
*B60R 25/24* (2013.01)

(52) U.S. Cl.
CPC ............... *H04K 3/41* (2013.01); *B60R 25/24* (2013.01); *H04K 2203/22* (2013.01)

(58) Field of Classification Search
CPC ....... H04K 3/41; H04K 2203/22; B60R 25/24
USPC .................. 455/1, 41.1, 41.2, 41.3
See application file for complete search history.

(56) References Cited

U.S. PATENT DOCUMENTS

| | | | | |
|---|---|---|---|---|
| 5,252,966 A * | 10/1993 | Lambropoulos | ... | G07C 9/00182 340/5.64 |
| 5,384,495 A * | 1/1995 | Waggamon | ............... | H02H 5/10 307/326 |
| 5,825,007 A * | 10/1998 | Jesadanont | .......... | G07B 15/063 235/384 |
| 5,844,517 A * | 12/1998 | Lambropoulos | ... | G07C 9/00309 341/176 |
| 5,929,769 A * | 7/1999 | Garnault | ............. | B60R 25/2009 340/12.51 |
| 6,127,922 A * | 10/2000 | Roddy | ..................... | B60R 25/24 340/12.5 |
| 6,218,932 B1 * | 4/2001 | Stippler | ................... | B60R 25/04 307/10.2 |
| 6,323,566 B1 * | 11/2001 | Meier | ................. | G07C 9/00309 307/10.2 |
| 6,538,560 B1 * | 3/2003 | Stobbe | .................... | B29C 44/56 340/5.72 |
| 6,548,915 B1 * | 4/2003 | Geber | ............... | B60R 25/02142 307/10.2 |
| 6,570,486 B1 * | 5/2003 | Simon | ..................... | B60R 25/04 307/10.2 |
| 6,577,226 B1 * | 6/2003 | Steiner | .................... | E05B 81/78 340/10.34 |
| 6,658,328 B1 * | 12/2003 | Alrabady | ........... | G07C 9/00309 307/10.2 |
| 6,714,119 B1 * | 3/2004 | Mindl | ..................... | B60R 25/24 340/5.61 |
| 6,744,349 B1 * | 6/2004 | Asakura | ................ | B60R 25/245 340/5.6 |

(Continued)

FOREIGN PATENT DOCUMENTS

DE 10 2011 116 209 A1 4/2012

*Primary Examiner* — Hai V Nguyen
(74) *Attorney, Agent, or Firm* — Freestone Intellectual Property Law PLLC; Aaaron J. Visbeek (57) ABSTRACT

A jamming radio signal is outputted to interfere with an interrogation signal emitted by a vehicle for verifying a tag of a vehicle key that provides access to the vehicle. An access signal including access data is received. The output of the jamming radio signal is halted, at least temporarily, when the access data matches an access code so that the tag of the vehicle key can be authenticated.

20 Claims, 6 Drawing Sheets

(56) References Cited

U.S. PATENT DOCUMENTS

| | | | | |
|---|---|---|---|---|
| 6,778,065 B1* | 8/2004 | Asakura | B60R 25/245 | 340/12.5 |
| 6,930,607 B2* | 8/2005 | Kiel | G08B 21/02 | 340/573.1 |
| 6,956,499 B2* | 10/2005 | Shinada | B60R 16/0231 | 307/10.1 |
| 6,963,268 B2* | 11/2005 | Brillon | G07C 9/00309 | 340/12.51 |
| 6,980,082 B2* | 12/2005 | Ueda | G07C 9/00309 | 340/426.16 |
| 7,142,090 B2* | 11/2006 | Ueda | B60R 25/24 | 340/5.61 |
| 7,193,334 B2* | 3/2007 | Hiramitsu | B60R 25/045 | 307/10.1 |
| 7,221,255 B2* | 5/2007 | Johnson | G07C 5/008 | 340/10.2 |
| 7,283,034 B2* | 10/2007 | Nakamura | B60R 25/246 | 340/5.72 |
| 7,342,324 B2* | 3/2008 | Bottomley | B60R 25/24 | 307/10.3 |
| 7,388,466 B2* | 6/2008 | Ghabra | E05B 81/78 | 340/5.61 |
| 7,394,350 B2* | 7/2008 | Yoshida | B60R 25/04 | 307/10.2 |
| 7,550,869 B2* | 6/2009 | Higuchi | B60R 25/24 | 307/10.2 |
| 7,597,250 B2* | 10/2009 | Finn | G06K 19/07732 | 235/380 |
| 7,629,876 B2* | 12/2009 | Nagai | B60R 25/24 | 340/426.13 |
| 7,961,076 B2* | 6/2011 | Kelley | B60R 25/257 | 340/5.52 |
| 8,053,922 B2* | 11/2011 | Muller | G07C 9/00309 | 307/10.1 |
| 8,106,752 B2* | 1/2012 | Golden | G07C 9/20 | 340/426.11 |
| 8,150,563 B2* | 4/2012 | Georgi | B60R 25/245 | 701/2 |
| 8,299,891 B2* | 10/2012 | Yamamoto | B60R 25/24 | 340/5.26 |
| 8,902,040 B2* | 12/2014 | Greisen | G07C 9/00571 | 340/5.51 |
| 9,100,797 B2* | 8/2015 | Biondo | H04W 4/046 | |
| 9,299,053 B2* | 3/2016 | Gazdzinski | G04G 21/025 | |
| 9,379,780 B2* | 6/2016 | Widmer | B60L 53/126 | |
| 9,685,013 B2* | 6/2017 | Nair | G07C 9/00309 | |
| 9,957,737 B2* | 5/2018 | Patel | E05B 81/77 | |
| 9,972,148 B2* | 5/2018 | Huennekens | B60R 25/24 | |
| 9,988,014 B2* | 6/2018 | Parasurama | B60R 25/1012 | |
| 10,011,225 B2* | 7/2018 | Schmitt | G07C 5/08 | |
| 10,240,365 B2* | 3/2019 | Almomani | E05B 47/0001 | |
| 10,366,260 B2* | 7/2019 | Lee | B60R 25/24 | |
| 2002/0070845 A1* | 6/2002 | Reisinger | B60R 25/24 | 340/5.61 |
| 2004/0011967 A1* | 1/2004 | Nutting | G01N 21/3563 | 250/492.1 |
| 2004/0100392 A1* | 5/2004 | Brillon | G07C 9/00309 | 340/12.51 |
| 2004/0130457 A1* | 7/2004 | Ueda | B60R 25/24 | 340/5.72 |
| 2004/0130462 A1* | 7/2004 | Ueda | G07C 9/00309 | 340/901 |
| 2004/0150508 A1* | 8/2004 | Mosgrove | B60R 25/24 | 340/5.21 |
| 2004/0222699 A1* | 11/2004 | Bottomley | B60R 25/24 | 307/9.1 |
| 2005/0035852 A1* | 2/2005 | Paulsen | G07C 5/085 | 340/438 |
| 2005/0052286 A1* | 3/2005 | Perraud | B60C 23/0433 | 340/12.22 |
| 2005/0076242 A1* | 4/2005 | Breuer | H04W 12/0802 | 726/4 |
| 2005/0261816 A1* | 11/2005 | DiCroce | B60R 25/10 | 701/36 |
| 2006/0176147 A1* | 8/2006 | Pohlmann | B60R 25/24 | 340/5.61 |
| 2006/0197381 A1* | 9/2006 | Yoshimura | G07C 9/00309 | 307/10.2 |
| 2006/0219776 A1* | 10/2006 | Finn | G06K 19/07732 | 235/380 |
| 2006/0226213 A1* | 10/2006 | Ashili | G06K 7/0008 | 235/375 |
| 2006/0279467 A1* | 12/2006 | LeMense | H01Q 1/3241 | 343/711 |
| 2007/0090921 A1* | 4/2007 | Fisher | G07C 9/00309 | 340/5.73 |
| 2007/0159297 A1* | 7/2007 | Paulk | B60R 25/104 | 340/5.73 |
| 2007/0197261 A1* | 8/2007 | Humbel | G07C 9/257 | 455/558 |
| 2007/0200671 A1* | 8/2007 | Kelley | B60R 25/257 | 340/5.72 |
| 2007/0273534 A1* | 11/2007 | McGinn | G07C 9/00912 | 340/572.8 |
| 2008/0061763 A1* | 3/2008 | Nutting | G01N 21/35 | 324/71.1 |
| 2009/0167526 A1 | 7/2009 | Graves | | |
| 2009/0224890 A1* | 9/2009 | Kim | G06K 19/0723 | 340/10.33 |
| 2010/0217457 A1* | 8/2010 | Georgi | G07C 9/00309 | 701/2 |
| 2010/0231351 A1* | 9/2010 | Lickfelt | B60R 25/24 | 340/5.6 |
| 2012/0153894 A1* | 6/2012 | Widmer | H02J 50/40 | 320/108 |
| 2012/0286927 A1* | 11/2012 | Hagl | G07C 9/00309 | 340/5.61 |
| 2013/0033381 A1* | 2/2013 | Breed | B60T 7/16 | 340/568.1 |
| 2013/0043973 A1* | 2/2013 | Greisen | G07C 9/00817 | 340/5.51 |
| 2013/0090744 A1* | 4/2013 | Tran | G07C 9/00309 | 700/9 |
| 2013/0141212 A1* | 6/2013 | Pickering | H04B 1/3888 | 340/5.61 |
| 2014/0232322 A1 | 8/2014 | Kracker | | |
| 2015/0116081 A1* | 4/2015 | Nair | G07C 9/00309 | 340/5.61 |
| 2016/0180621 A1* | 6/2016 | Desinor, Jr. | G07C 9/00896 | 340/5.61 |
| 2016/0241999 A1* | 8/2016 | Chin | G07C 9/32 | |
| 2018/0056936 A1* | 3/2018 | Parasurama | B60R 25/1012 | |
| 2018/0118010 A1* | 5/2018 | Korros | B60J 11/04 | |
| 2018/0262891 A1* | 9/2018 | Wu | H04L 63/0492 | |
| 2018/0349656 A1* | 12/2018 | Lee | G06K 7/10366 | |
| 2019/0287065 A1* | 9/2019 | Shintani | B60R 25/01 | |
| 2019/0303632 A1* | 10/2019 | Lee | B60R 25/24 | |
| 2019/0322242 A1* | 10/2019 | Koike | E05B 81/00 | |
| 2019/0329732 A1* | 10/2019 | Hocke | B60R 25/245 | |
| 2019/0333304 A1* | 10/2019 | Flynn | H04L 9/3228 | |

\* cited by examiner

INTERFERING RADIO AND VEHICLE KEY LOCKER

BACKGROUND INFORMATION

Increasingly, different vehicle-sharing services are providing opportunities to access vehicles. Some vehicle-sharing services provide access by the minute, hour, and/or days. Some vehicle-sharing services provide a fleet of vehicles that are accessed by consumers. Other vehicle-sharing services are peer-to-peer. In some contexts, a company possesses a fleet of vehicles and desires to selectively provide access to different operators or employees for specific periods of time.

In vehicle-sharing contexts, logistical challenges arise from physically providing a vehicle key to the intended driver for the proper amount of time. Additionally, providing the vehicle key to a driver may limit access of the vehicle to a different driver who would be authorized to use the vehicle. Furthermore, providing the key to the vehicle exposes the provider to risk that the key will be copied or retained for malicious purposes. Yet an additional risk of providing the key to the vehicle is having the vehicle stolen using the provided key as a means to access or drive the vehicle.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method for a selectively emitting a radio signal to control access to a vehicle are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments of the disclosure include a system that selectively emits a jamming radio signal to control access to a vehicle. When a vehicle key is provided within a vehicle as part of a vehicle-sharing arrangement, there may be some cases where a bad actor is able to move the vehicle using the vehicle key located in the vehicle. By way of an example, a bad actor could gain unauthorized access to the vehicle (e.g. by breaking a window, picking lock) and use the vehicle key that is located in the vehicle to drive the vehicle to a new location (e.g. a garage). Once at the new location, anti-theft devices and/or alarms may be disabled and the vehicle may be further modified or even disassembled without further scrutiny. Hence, controlling access to the vehicle key and also access to the vehicle is highly desirable.

A vehicle key may have a radio-frequency identification (RFID) tag that allows for access to the vehicle and operation of the vehicle. For example, the tag of the vehicle key may have been factory set by the vehicle manufacturer or authorized dealer to allow access and/or allow the vehicle to start/drive. Typically, a vehicle reader transmits an interrogation signal and receives a response signal from the RFID tag of a vehicle key. Based on the response signal from the RFID tag, access to the vehicle or operation of the vehicle is controlled. Therefore, the response signal can authenticate that the correct vehicle key is present and the vehicle may be accessed, started, and operated.

When a vehicle key remains in the vehicle for vehicle-sharing contexts, there is the possibility that the vehicle key is used to start and operate the car even when the access to the vehicle is unauthorized. In embodiments of the disclosure, a vehicle key is included in a vehicle key locker sized to store the vehicle key. A jamming radio signal is selectively outputted to interfere with an interrogation signal emitted by the vehicle reader of the vehicle. When the jamming radio signal is outputted, the interrogation signal degenerates into a deteriorated signal that is not capable of successfully soliciting a response signal from the tag of the vehicle tag. Therefore, selectively emitting the jamming radio signal allows for controlling access to the vehicle by way of selectively allowing for an authentication of the vehicle key. The vehicle key may be stored in a vehicle key locker that is inaccessible or hidden from operators of the vehicle. In some embodiments, the jamming radio signal is emitted from a jamming radio of the vehicle key locker. The jamming radio signal may be paused or turned off in response to receiving access data that matches an access code. In one example, a user provides the access data via a touchpad included in vehicle. In one example, a user provides the access data via a mobile device. Consequently, authorized users who provide the correct access data may cause the jamming radio signal to be paused (or halted) to allow the user to access and/or start and operate the vehicle. In contrast, the jamming radio signal will prevent unauthorized users from starting and operating the vehicle as the interrogation signal from the vehicle will not properly interrogate the tag of the vehicle key to elicit the response signal from the tag.

In concert with selectively outputting the radio jamming signal, the vehicle key locker may modulate the shielding of the vehicle key from the interrogation signal of the vehicle reader. For example, for a vehicle key locker made of metal or otherwise provides a Faraday cage that shields the vehicle key from an interrogation signal, a key locker door of the vehicle key locker may open when the correct access data is received. Opening the key locker door allows the interrogation signal of the reader to elicit the response signal from the tag and authenticate the vehicle key. However, there may be cases where the interrogation signal still reaches the vehicle key even when the vehicle key resides in a shielded vehicle key locker. In these cases, selectively outputting the jamming radio signal to interfere with the interrogation signal further ensures security of the vehicle. In addition, selectively outputting the jamming radio signal may be utilized without modulating a shielding of the vehicle key locker, in some embodiments.

Utilizing particular embodiments of the disclosure, access to a vehicle may be assigned to a particular person having the access data for a particular amount of time. Furthermore, the physical vehicle key does not need to be exchanged and access to the vehicle key need not be provided so that a user who has access to the vehicle may not retain or copy the vehicle key. In contrast, existing vehicle-sharing services have the vehicle key inside the vehicle and accessible to the user. These and other embodiments of the disclosure with be described in detail below with respect to FIGS. 1-5.

Figure 1:
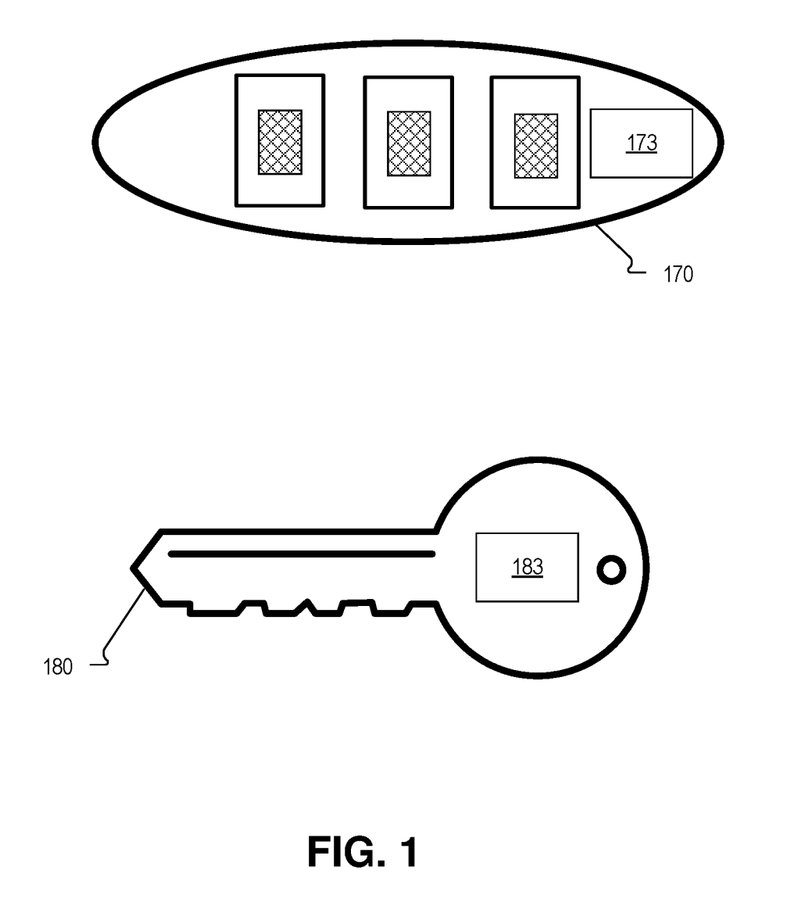
FIG. 1 includes example keys that may be used to access a vehicle, in accordance with aspects of the disclosure.

FIG. 1 illustrates example vehicle keys that may be used to access a vehicle, in accordance with aspects of the disclosure. Key 170 is an example wireless key that incorporates a remote control and a blade of the key is not required to access the vehicle and/or start/drive the vehicle. Key 170 includes a tag 173. Tag 173 may be a passive (unpowered) or an active (powered) tag. In one embodiment, tag 173 is an RFID tag configured to generate a response signal when the tag 173 receives an interrogation signal from an RFID reader of a vehicle associated with the key 170.

Key 180 is an example wireless key that may include a blade of a key for accessing the vehicle and/or start/drive the vehicle. Key 180 may also incorporate a remote control to access the vehicle. Key 180 includes a tag 183. Tag 183 may be a passive (unpowered) or an active (powered) tag. In one embodiment, tag 183 is an RFID tag configured to generate a response signal when the tag 173 receives an interrogation signal from an RFID reader of a vehicle associated with the key 180.

Figure 2A:
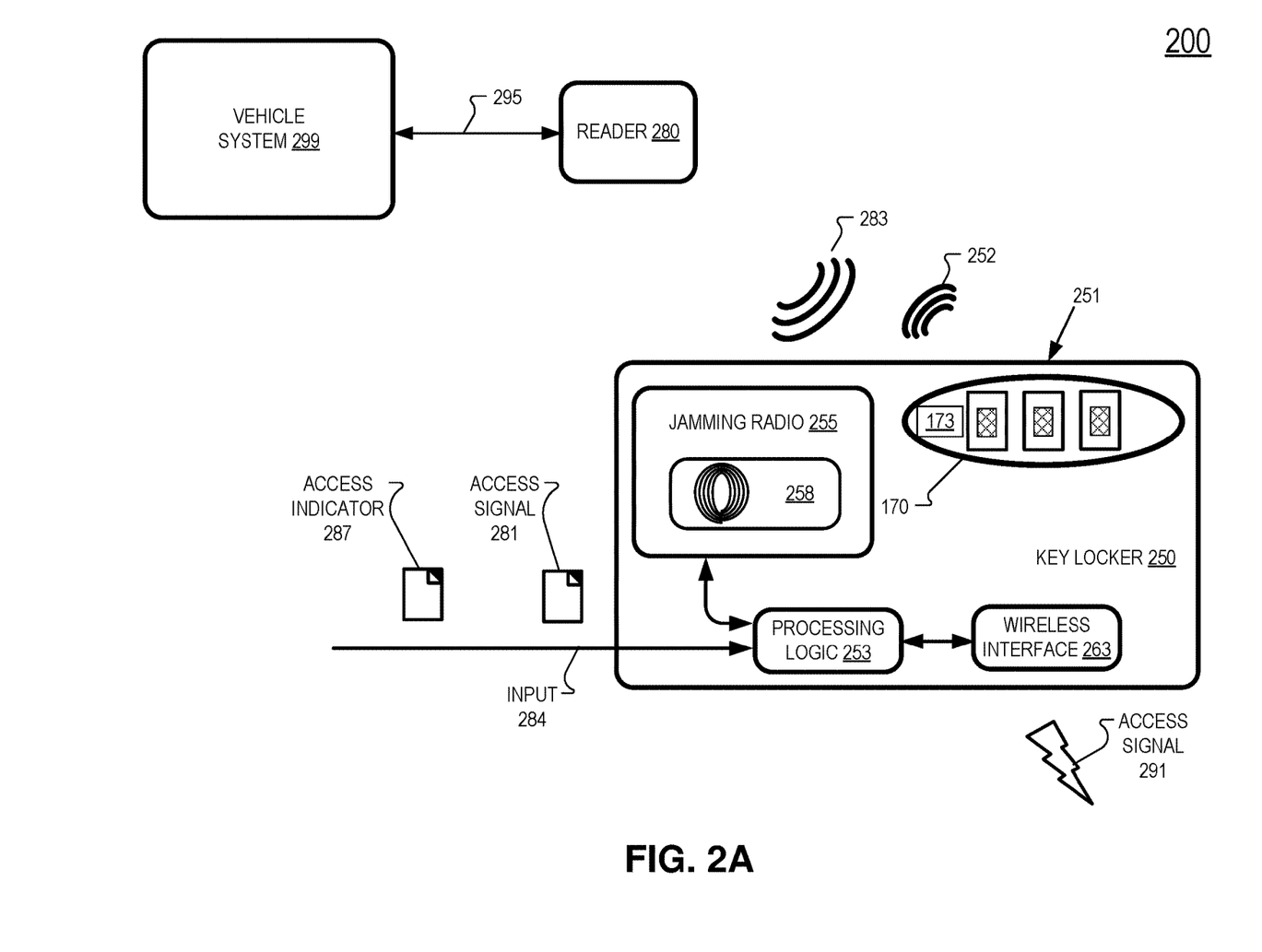
FIG. 2A-2B illustrates a vehicle system including a jamming radio for outputting a jamming radio signal to control access to a vehicle, in accordance with aspects of the disclosure.

Vehicle keys that include a tag (e.g. keys 170 and 180) may be placed in a vehicle key locker such as vehicle key locker 250 of vehicle system 200, illustrated in FIG. 2A. Key locker 250 is sized to store a vehicle key such as key 170 or 180. In the illustrated embodiment, vehicle key 170 is stored in key locker 250, although the illustration may not be to scale. Key Locker 250 may be only marginally longer, wider, and taller than vehicle key 170 even though the illustrated block diagram is sizably larger than vehicle key 170, for illustration of the components of key locker 250.

Key locker 250 may include a key locker body 251 made of metal, plastic, or otherwise, depending on the particular embodiment. In some embodiments, key locker body 251 is fabricated so that it shields the inside of the key locker 250 from radio waves/signals. To accomplish this, the key locker body 251 may be made from metal, incorporate a metal mesh, or otherwise form a Faraday cage.

In FIG. 2A, example key locker 250 includes a wireless interface 263, processing logic 253, and jamming radio 255. Jamming radio 255 includes a radio scanner 258 configured to sense an interrogation signal 283 emitted by a vehicle. Processing logic 253 is coupled to jamming radio 255, wireless interface 263, and coupled to receive signals from input 284.

Wireless interface 263 may include antennas and corresponding circuitry to receive and/or transmit BlueTooth, cellular, IEEE 802.11x wireless communication signals and/or optical signals (e.g. infrared signals). Wireless interface 263 may therefore receive a wireless access signal 291 from a mobile device, computer, a radio-based remote control, or optical-based remote control. Wireless interface 263 may also receive a wireless access signal 291 from a cellular communications tower utilizing 2G/3G/4G/LTE/5G or other cellular data standard, in some embodiments.

Processing logic 253 may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic 253 to store instructions to execute operations and/or store data.

In FIG. 2A, vehicle reader 280 is communicatively coupled to vehicle system 299 via communication channel 295. Communication channel 295 may be either wired or wireless, in different embodiments. In one example, communication channel 295 is a wired communication channel utilizing CAN (Controller Area Network) bus protocols. In one embodiment, vehicle reader 280 is an RFID reader. Vehicle reader 280 is configured to transmit an interrogation signal 283 and is configured to receive a response signal 252 from a vehicle key stored in key locker 250, in some embodiments. Interrogation signal 283 may be approximately 300 MHz, in some embodiments. Vehicle system 299 may have access to or include a vehicle computer that controls providing access to the vehicle and/or starting and stopping the vehicle. In one embodiment, vehicle system 299 includes a starting circuit that controls whether the vehicle can be started, by turning the keys in the ignition or by pushing a START/STOP button of the vehicle in combination with vehicle system 299 sensing a vehicle key. Vehicle system 299 may generally include electrical modules for operating a powerplant of the vehicle, heating and cooling the vehicle, and providing vehicle information such as speed, position, and maintenance information to the user. Vehicle system 299 may include a plurality of electrical harnesses, vehicle computers, electrical control modules, switches, and buttons.

In some embodiments, vehicle system 299 senses that a user is attempting to access the vehicle and prompts reader 280 to transmit interrogation signal 283 in response. For example, if someone engages a door handle of the vehicle, vehicle system 299 may sense the engagement and prompt reader 280 to transmit interrogation signal 283 to authenticate a tag of a vehicle key. In another example, a user engages a starting interface (e.g. key ignition or START/STOP button) and vehicle system 299 prompts reader 280 to transmit the interrogation signal 283 to authenticate that the tag of a proximate vehicle key is authorized to operate the vehicle.

Figure 4:
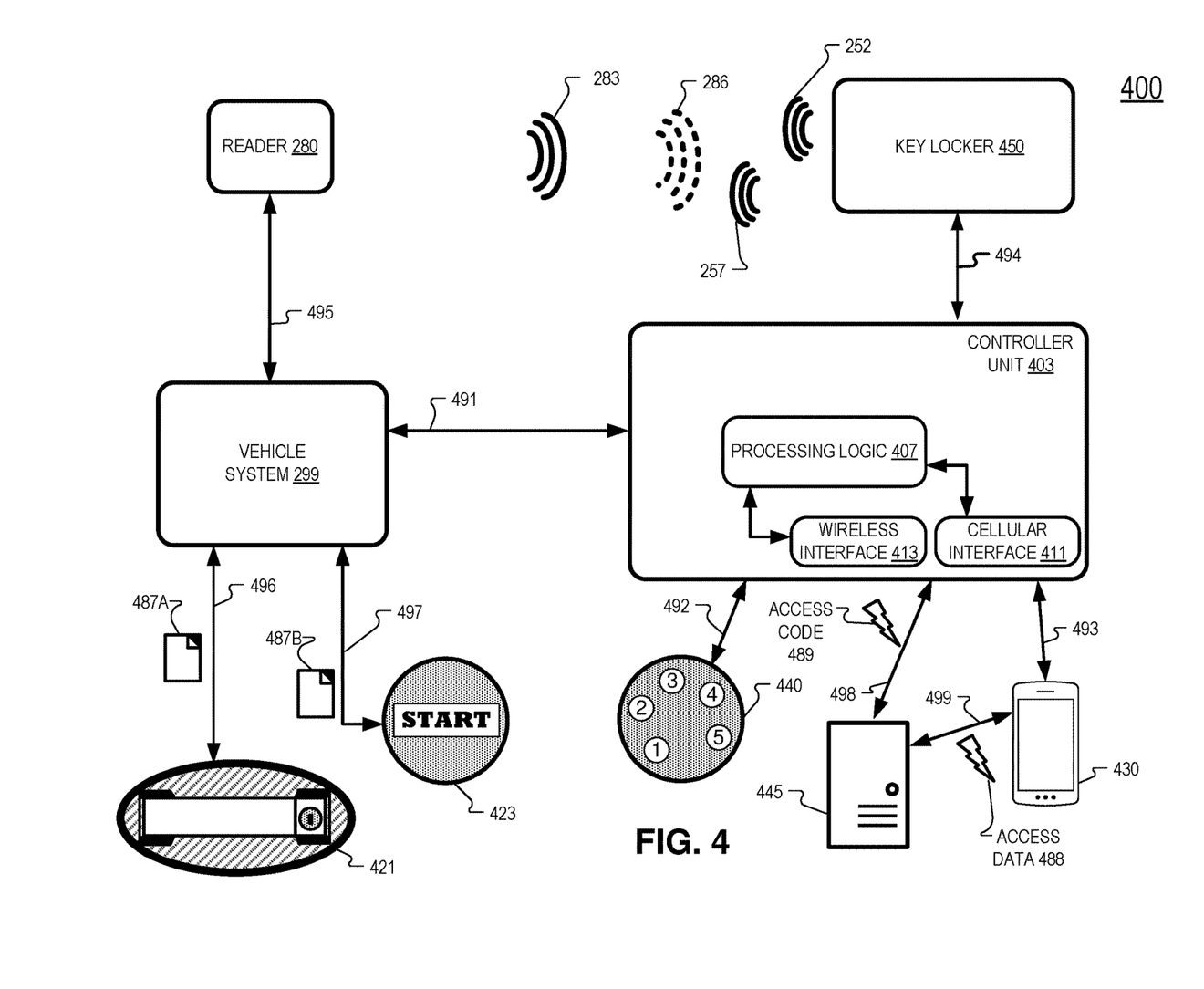
FIG. 4 illustrates a vehicle system including a vehicle reader, a controller unit, a keypad, a server, and a mobile device, in accordance with aspects of the disclosure.

Referring briefly to FIG. 4, vehicle system 299 is illustrated as receiving access indicators 487 from door handle or door lock 421 as well as a starting interface 423. Starting interface 423 is illustrated as a START/STOP button 423 that provides operation access to the vehicle. In the case of a vehicle with a petrol-based engine, the START/STOP button may engage a starter to turn over and start the engine of the vehicle. In the case of an electric vehicle, the starting interface 423 may allow for operation of the battery power plant to power the drivetrain of the vehicle to operate/navigate the vehicle. Starting interface 423 may also include a keyed ignition of the vehicle. Hence, vehicle system 299 may prompt reader 280 to transmit interrogation signal 283 in response to sensing engagement from elements 421 or 423 and receiving access indicators 487A or 487B, respectively. Access indicator(s) 487 may be an analog electrical signal (e.g. sensing an electrical current value or voltage level) or a digital message (e.g. a digital message on a CAN bus).

Returning to FIG. 2A, processing logic 253 of key locker 250 may receive access indicator 287 on input 284. Processing logic 253 may also receive access signal 281 on input 284. Access signal 281 may include access data that a user provides to gain access to the vehicle. Access signal 281 may include a series of key entries from a touchpad, for example. In some embodiments, wireless interface 263 receives access signal 291 and provides access signal 291 to processing logic 253. Wireless access signal 291 may be provided by a user's mobile device to gain access the vehicle, for example.

Figure 2B:
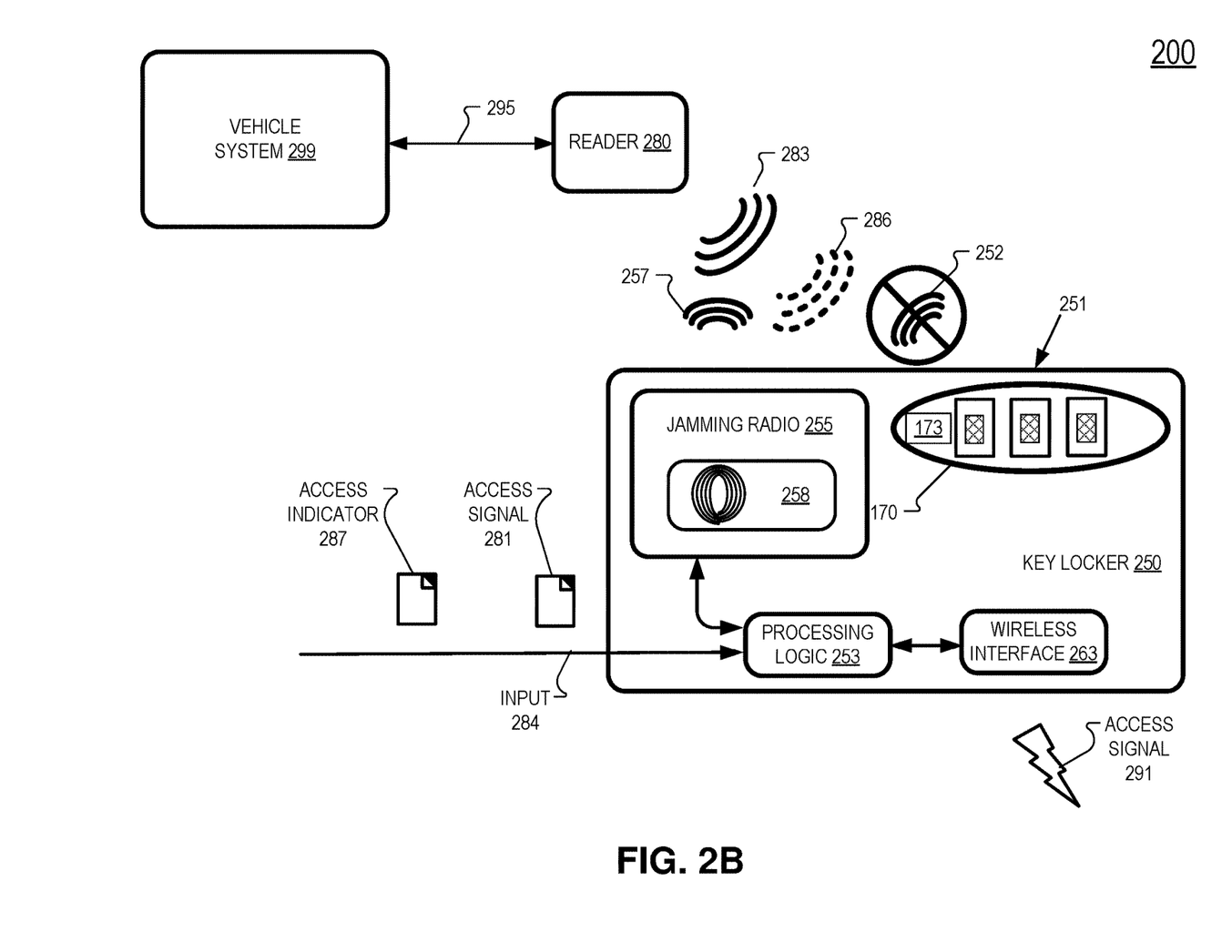

Processing logic 253 may be configured to receive an access indicator 287 indicative of a user attempting to access the vehicle. FIG. 2B shows that, in operation, processing logic 253 may activate jamming radio 255 to output jamming radio signal 257 in response to receiving access indicator 287. Activating the jamming radio 255 in response to receiving access indicator(s) 287 may reduce the power consumption associated with embodiments where the jamming radio signal 257 is constantly outputted until the correct access data is received. When jamming radio signal 257 encounters interrogation signal 283, interrogation signal 283 degenerates into a deteriorated signal 286 that is not capable of soliciting a response from tag 173 and thus tag 173 does not output a response signal 252 even through reader 280 is transmitting an interrogation signal 283. Consequently, reader 280 is unable to authenticate key 170 and access to or operation of the vehicle is denied. In contrast to FIG. 2B, FIG. 2A shows that when jamming radio 255 does not output jamming radio signal 257, interrogation signal 283 is able to elicit response signal 252 from tag 173 and therefore authenticate tag 173 and provide access and/or operation of the vehicle. Therefore, selectively outputting jamming radio 255 and jamming radio signal 257 can control access to and permission to operate the vehicle. Jamming radio signal 257 may be between 40 kHz and 200 kHz, in some examples. Jamming radio signal 257 may include other frequencies that would sufficiently interfere with interrogation signal 283.

Processing logic 253 is configured to selectively activate/deactivate jamming radio 255 from outputting the jamming radio signal 257 based on receiving access data included in access signal 281/291. When the access data included in access signal 281/291 matches an access code accessible to processing logic 253, processing logic 253 is configured to deactivate jamming radio 255 from emitting jamming radio signal 257 so that interrogation signal 283 can elicit response signal 252 from tag 173 to authenticate key 170. Once processing logic 253 has deactivated jamming radio 255 from outputting jamming radio signal 257, processing logic 253 may be configured to wait for a pre-determined time period (e.g. 0.5 seconds) since deactivating jamming radio 255 and then activate or reactivate jamming radio 255 to output jamming radio signal 257.

There are various ways for a user to provide the access data to gain access to the vehicle. In one embodiment, an input interface such as keypad 440 of FIG. 4 can be placed on the inside of a vehicle (e.g. under the windshield) and the buttons of the keypad 440 are capacitive-sense buttons such that the buttons are sensitive to a finger "pressing" the button through the glass of the vehicle. In one embodiment, keypad 440 is configured to be mounted on the outside of the vehicle.

In one embodiment, a user uses a mobile application (running on mobile device 430 of FIG. 4) having access data to wirelessly transmit the access data to the wireless interface 263 of vehicle key locker 250. In one embodiment, the access data is transmitted from a mobile device to wireless interface 263 via a BlueTooth protocol. The user may enter the access data into the mobile application or the access data may be provided to the mobile application via a server that stores reservation data for users that is associated with a vehicle that the user selected. The access data may be received by the mobile device via a cellular connection or a WiFi connection.

In one embodiment, the access data is transmitted from a mobile device to wireless interface 263 using IEEE 802.11x protocols and frequencies. Wireless interface 263 may be configured to receive and/or transmit BlueTooth and/or WiFi. In one embodiment, the access data is transmitted from a mobile device to wireless interface 263 using cellular data (cellular data tower not illustrated) transmitted using 2G/3G/4G/LTE/5G or other cellular data standard that is used now or hereafter.

In some embodiments, jamming radio 255 includes a radio scanner sensor 258. In other embodiments, radio scanner 258 is a stand-alone component and communicatively coupled to processing logic 253. Radio scanner sensor 258 may be intermittently activated to scan for interrogation signal 283 emitted by the vehicle reader 280. The jamming radio 255 may be configured to be activated to output the jamming radio signal 257 when the interrogation signal 283 is sensed by the radio scanner sensor 258. Radio scanner sensor 258 may include a radio antenna that is configured to sense the radio frequency of interrogation signal 283. When the radio frequency of interrogation signal 283 is sensed by radio scanner sensor 258, the jamming radio 255 outputs jamming radio signal 257 so that reader 280 cannot complete the authentication of key 170. Radio scanner 258 may be intermittently activated for less than 100 milliseconds in any given second of time to scan for interrogation signal 283. This may assist to reduce the power consumption associated with constantly outputting a jamming radio signal 257. In some embodiments, radio scanner 258 is configured to be "listening" for less than 10% of the time to save on power consumption. In one embodiment, radio scanner sensor 258 is configured to be "listening" for less than 5% of the time to save on power consumption. By way of example, radio scanner sensor 258 may be configured to "listen" for 2 ms and "sleep" for 48 ms to save on electrical power consumption while also being responsive to interrupt interrogation signal 283 (and block authentication of key 170 or 180) in any given 50 ms period of time. If radio scanner sensor 258 does sense interrogation signal 283 in the 2 ms "listening" period, it immediately outputs a sense signal to jamming radio 255 so jamming radio 255 is prompted to output jamming radio signal 257. In embodiments where radio scanner sensor is separate from jamming radio 255 and separately communicatively coupled to processing logic 253, radio scanner sensor 258 may output the sense signal to processing logic 253.

Figure 3:
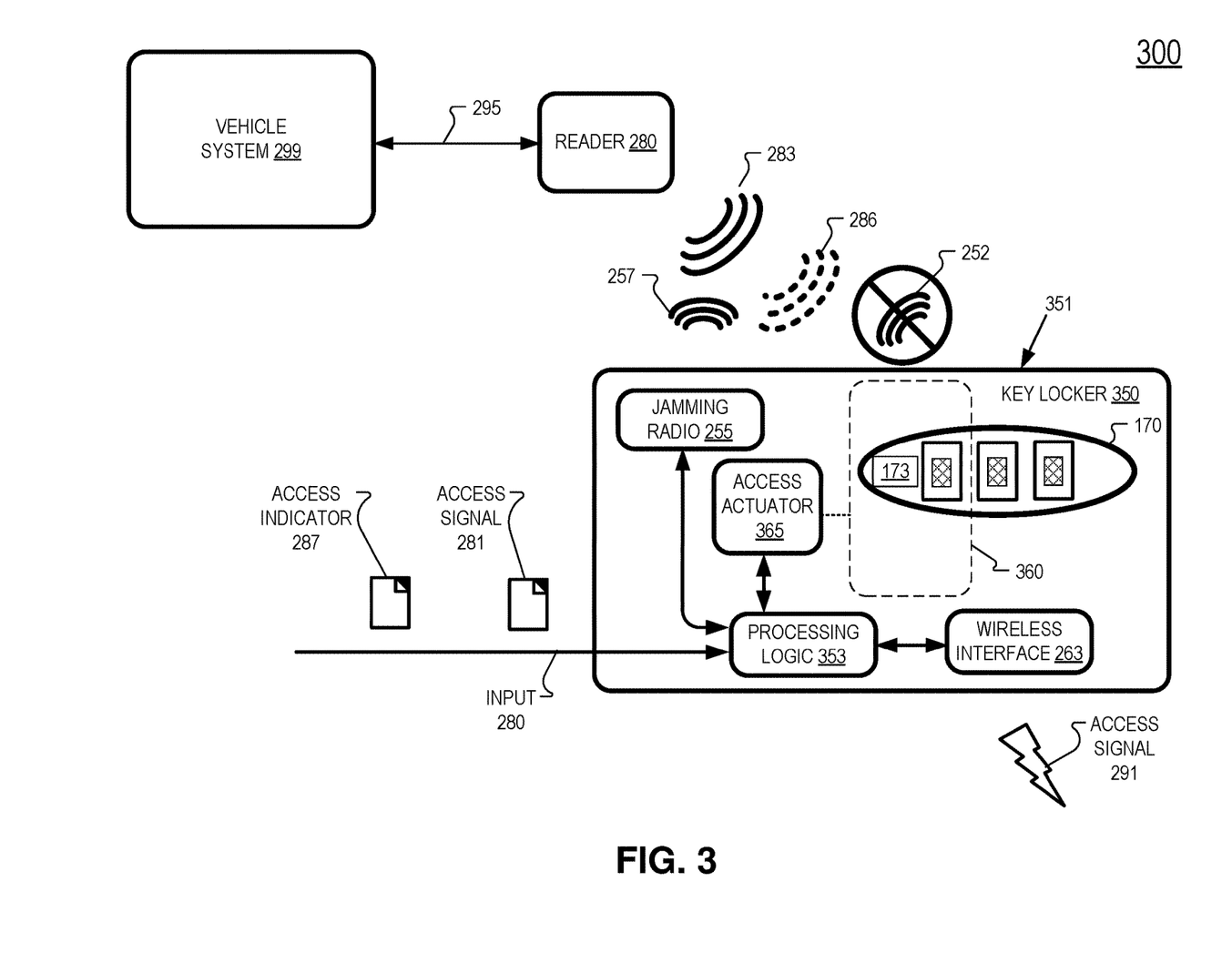
FIG. 3 illustrates a vehicle system including a jamming radio for outputting a jamming radio signal and a key locker door to control access to a vehicle, in accordance with aspects of the disclosure.

FIG. 3 illustrates an example vehicle system 300 where key locker 350 includes a key locker door 360 and access actuator 365 in addition to the features of key locker 250, in accordance with aspects of the disclosure. In the embodiment of FIG. 3, reader 280 may be prevented from authenticating key 170 because tag 173 is shielded from receiving interrogation signal 283 by the key locker body 351. Key locker body 351 is fabricated so that it shields the inside of the key locker 350 from radio waves/signals. To accomplish this, the key locker body 351 may be made from metal, or incorporate a metal mesh, or otherwise form a Faraday cage. However, key locker 350 also includes access actuator 365 configured to open and close key locker door 360. When key locker door 360 is open, tag 173 is no longer shielded from interrogation signal 283 and thus reader 280 can authenticate key 170. Yet, when key locker door 360 is closed, key 170 and tag 173 are substantially shielded from interrogation signal 283 and thus it may be more difficult or impossible for reader 280 to authenticate key 170. Therefore, controlling the operation of key locker door 360 may, on its own, be sufficient to control access to the vehicle by selectively shielding key 170 from interrogation signal 283.

However, some vehicle readers 280 emit a very strong interrogation signal 283 that may penetrate shielding of key locker body 351 even when key locker door 360 is closed. And, some vehicle readers 280 actually increase the transmission power of interrogation signal 283 when the vehicle unsuccessfully authenticates a key. For example, if a starting interface of a vehicle is engaged, but the vehicle is unable to authenticate a key, the vehicle reader may increase transmission power of interrogation signal 283 in order to further its effort to authenticate a key.

In contexts where interrogation signal 283 may be successful in authenticating a key housed by a key locker where the key locker door 360 is closed, jamming radio 255 may be included in a system to further assist in shielding key 170 by interfering with interrogation signal 283. Thus, in some embodiments, key locker door 360 is opened and jamming radio 255 is deactivated when access data matches an access code. When no access to the vehicle is granted, key locker door 360 is closed and jamming radio 255 is selectively activated to interfere with interrogation signal 283 to prevent authentication of key 170.

As such, in some embodiments, key locker 350 includes key locker door 360 configured to substantially shield tag 173 of vehicle key 170 from receiving interrogation signal 283 and shields vehicle key 170 from transmitting radio signals (e.g. response signal 252) outside key locker body 351 when the key locker door 360 is closed. Processing logic 353 is communicatively coupled to access actuator 365 to control the opening of key locker door 360, in FIG. 3.

When key locker door 360 is to be opened, access actuator 365 receives an actuation signal from processing logic 353, in the illustrated embodiment. Access actuator 365 may include a stepper motor that is mechanically coupled to key locker door 360 to open the key locker door 360 a distance defined by the actuation signal. In some embodiments, a servo, motor, actuator, or combination may be utilized to move key locker door 360.

FIG. 4 illustrates a vehicle system 400 that includes a key locker 450, in accordance with aspects of the disclosure. Vehicle system 400 includes a controller unit 403, a keypad 440, a mobile device 430, vehicle system 299, vehicle reader 280, and a key locker 450, in accordance with an embodiment of the disclosure. Controller unit 403 includes processing logic 407, cellular interface 411, and wireless interface 413. Wireless interface 413 may include a cellular radio configured for sending and/or receiving cellular data utilizing 2G/3G/4G/LTE/5G or other cellular data standard that is used now or hereafter. Processing logic 407 may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic 407 to store instructions to execute operations and/or store data. In some embodiments, processing logic 407 includes one or more volatile or non-volatile memories to store data such as an access code.

Keypad 440 is communicatively coupled to controller unit 403 via communication channel 492. In one example, communication channel 492 is a wireless communication channel (e.g. BlueTooth and/or WiFi/802.11x). Mobile device 430 is communicatively coupled to controller unit 403 via communication channel 493. In one example, communication channel 493 is a wireless communication channel (e.g. BlueTooth and/or WiFi/802.11x). Vehicle system 299 is communicatively coupled to controller unit 403 via communication channel 491. In one example, communication channel 491 is a wired communication channel utilizing CAN (Controller Area Network) bus protocols. Processing logic 407 may include an input to receive communication channel 491. Key locker 450 is communicatively coupled to controller unit 403 via communication channel 494. Key locker 450 may include the features of key locker 250 or 350. In one example, communication channel 494 is a wireless communication channel (e.g. BlueTooth and/or WiFi/802.11x). In one example, communication channel 494 is a wired communication channel, utilizing I²C (Inter-Integrated Circuit), or SPI (Serial Peripheral Interface) protocols. Communication channel 494 may be an encrypted channel. Vehicle reader 280 is communicatively coupled to vehicle system 299 via communication channel 495.

Door handle or door lock 421 is coupled to provide access indicator 487A to vehicle system 299 via communication channel 496 when a user engages a door handle or a door lock of the vehicle. Starting interface 423 is coupled to provide access indicator 487B to vehicle system 299 via communication channel 497 when a user engages starting interface 423. Access indicators 487A and/or 487B may be passed from vehicle system 299 to controller unit 403 via communication channel 491, in some embodiments. In an embodiment (not illustrated), door handle or door lock 421 and/or starting interface 423 are coupled to controller unit 403 so that controller unit 403 may receive access indicator(s) 487A and/or 487B directly. Communication channels 491, 492, 493, 494, 495, 496, and 497, may be either wired or wireless, in different embodiments.

Server 445 is communicatively coupled to communicate with controller unit 403 via wireless interface 413 or cellular interface 411. The access code(s) 489 that the access data is compared to may be sent to system 400 by a provisioning server such as server 445. Server 445 may then also separately provide the access data 488 that matches the access code 489 to mobile device 430 via communication channel 499 so a user can enter the access data 488 into keypad 440 to gain access to the vehicle. Access data 488 may also be wirelessly provided to system 400 via a wireless communication interface 493.

Key locker 450 may include any of the features of key locker 250 and 305, although FIG. 4 illustrates that some of the components that were included in key lockers 250 and 350 may be included in controller unit 403. For example, a wireless interface 413 may be included in controller unit 403 instead of key locker 450 and wireless communications may be received on wireless interface 413 and transmitted to key locker 450 via communication channel 494. Similarly, processing logic 407 may perform some or all of the processes described with respect to processing logic 253 or 353. Furthermore, jamming radio 255 may be located within controller unit 403 and coupled to processing logic 407 instead of being included in key locker 450, in some embodiments.

Figure 5:
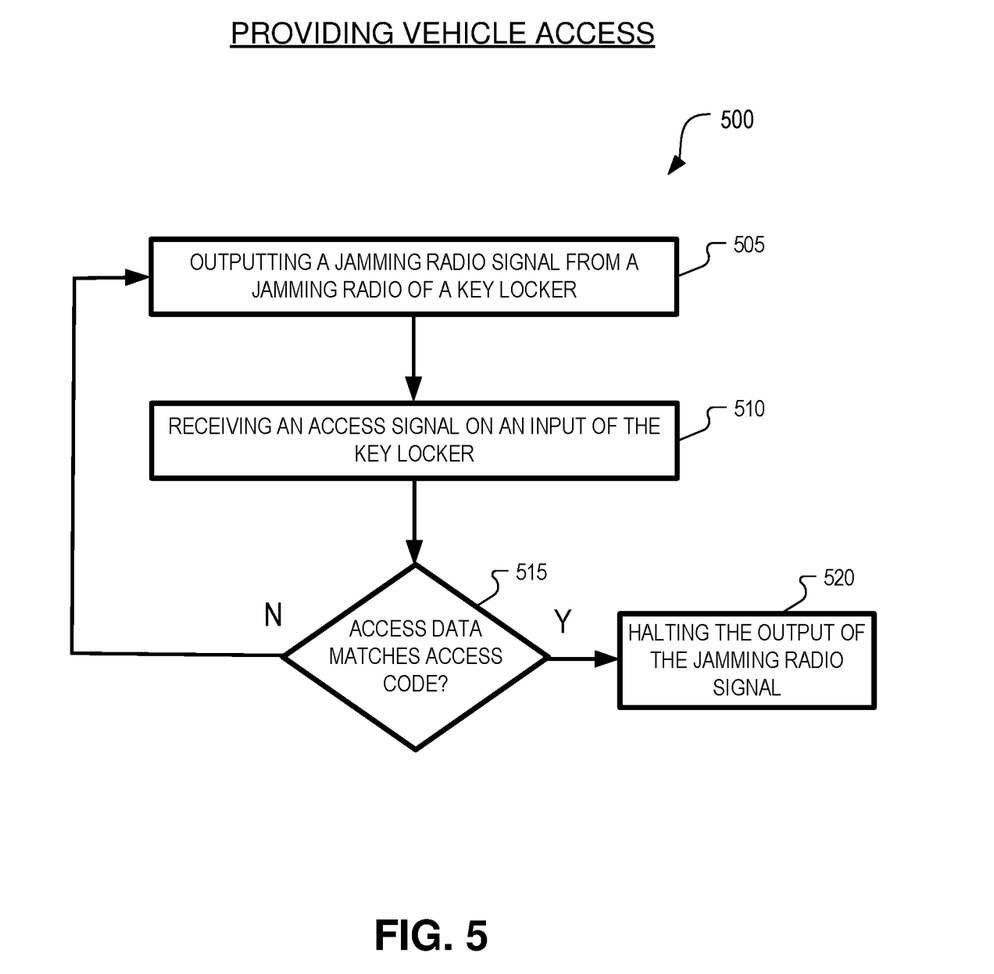
FIG. 5 illustrates a flow chart for a computer-implemented method of selectively providing access to a vehicle, in accordance with aspects of the disclosure.

FIG. 5 illustrates a flow chart of an example process of selectively providing access to a vehicle, in accordance with aspects of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. All or a portion of the process blocks of process 500 may be executed by processing logic 253, 353, or 407, for example.

In process block 505, a jamming radio signal (e.g. jamming radio signal 257) is emitted from a jamming radio (e.g. 255) of a key locker. The jamming radio signal is configured to interfere with an interrogation signal emitted by a vehicle for verifying a tag of a vehicle key that provides access to the vehicle. In some embodiments, the jamming radio signal may be emitted from a jamming radio that is disposed in the vehicle, but not included in the key locker.

In process block 510, an access signal (e.g. access signal 281 or 291) is received on an input to the key locker. The input may be a wireless interface, a cellular interface, or a wired analog or digital input. Access data included in the access signal may be provided by a keypad or a mobile device.

In process block 515, when the access signal does not include access data that matches an access code, process 500 may return to process block 505. When the access signal includes access data that matches an access code in process block 515, process 500 proceeds to process block 520. Processing logic 253, 353, or 407 may facilitate the comparison of the access data to the access code.

In process block 520, the jamming radio signal is halted or paused when the access data of the access signal matches the access code. Halting the output of the jamming radio signal allows the interrogation signal emitted by the reader of the vehicle to authenticate the tag of the vehicle key to provide access to the vehicle. In some embodiments, the jamming radio signal is paused for a pre-determined time period to allow the vehicle reader to authenticate the key included in a key locker and after the pre-determined time period, process 500 returns to process block 505 to resume the output of the jamming radio signal. In some embodiments of the disclosure, process 500 further includes opening a key locker door (e.g. key locker door 360) of the key locker when access data of the access signal matches the access code in process block 515.

In some embodiments, process 500 further includes receiving an access indicator (e.g. 287/487) indicative of a user attempting to access the vehicle and outputting the jamming radio signal is in response to receiving the access indicator. The access indicator may be generated by a user interacting with a door handle (e.g. pulling up on the door handle or pressing a button on or near the door handle to facilitate opening the door), door lock (e.g. turning a bladed key in the door lock), or starting interface of the vehicle, for example.

In some embodiments, process 500 further includes sensing the emission of the interrogation signal emitted by the vehicle and outputting the jamming radio signal is in response to sensing the emission of the interrogation signal. Radio scanner sensor 258 may be configured to sense the interrogation signal, for example. The radio sensor scanner may be included in the key locker or located elsewhere in the vehicle. In one embodiment, radio scanner sensor 258 is included in controller unit 403. The radio scanner sensor may be intermittently activated for less than 100 milliseconds of any given second of time to scan for the interrogation signal of the vehicle. A jamming radio may be configured to be activated to output the jamming radio signal when the interrogation signal is sensed by the radio scanner sensor.

In some vehicles, the interrogation signal increases in power when the vehicle reader fails to authenticate a vehicle key. In some embodiments of process 500, the radio scanner sensor performs a plurality of measurements of the interrogation signal over time, and when the measurements of the interrogation signals are increasing in power, the jamming radio signal of the jamming radio is also increased in power so that the interrogation signal 283 is not successful in authenticating the vehicle key.

The above disclosure has been discussed in the context of vehicle-sharing although it is contemplated that systems and methods of this disclosure could be used in the context of vacation rentals or short-term housing rentals to provide key access to a property for a limited period of time.

The term "processing logic" in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A "memory" or "memories" described in this disclosure may include volatile or non-volatile memory architectures.

Communication channels described herein may include wired or wireless communications utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), or otherwise.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method of selectively providing access to a vehicle, the computer-implemented method comprising:
outputting a jamming radio signal from a jamming radio of a key locker, wherein the jamming radio signal is configured to interfere with an interrogation signal emitted by a vehicle for verifying a tag of a vehicle key that provides access to the vehicle, the key locker includes a key locker body sized to store the vehicle key;
receiving an access signal on an input of the key locker;
determining whether the access signal includes access data that matches an access code; and
halting the output of the jamming radio signal when the access data of the access signal matches the access code, wherein halting the output of the jamming radio signal allows the interrogation signal to authenticate the tag of the vehicle key to provide access to the vehicle.

2. The computer-implemented method of claim 1 further comprising:
receiving an access indicator indicative of a user attempting to access the vehicle, wherein outputting the jamming radio signal is in response to receiving the access indicator.

3. The computer-implemented method of claim 2, wherein the access indicator is generated in response to the user engaging a door handle or door lock of the vehicle.

4. The computer-implemented method of claim 2, wherein the access indicator is generated in response to the user engaging a starting interface of the vehicle.

5. The computer-implemented method of claim 1 further comprising:
sensing the emission of the interrogation signal by the vehicle, wherein outputting the jamming radio signal is in response to sensing the emission of the interrogation signal.

6. The computer-implemented method of claim 5, wherein the interrogation signal of the vehicle is sensed by a radio scanner sensor of the key locker.

7. The computer-implemented method of claim 6, wherein the radio scanner sensor of the key locker is intermittently activated for less than 100 milliseconds of any given second of time to scan for the interrogation signal of the vehicle, the jamming radio configured to be activated to output the jamming radio signal when the interrogation signal is sensed by the radio scanner sensor.

8. The computer-implemented method of claim 1 further comprising:
resuming outputting the jamming radio signal after a pre-determined time period since the halting the output of the jamming radio signal.

9. The computer-implemented method of claim 1, wherein the jamming radio signal is between 40 kHz and 200 kHz.

10. The computer-implemented method of claim 1 further comprising:
opening a key locker door of the key locker when the access data of the access signal matches the access code.

11. The computer-implemented method of claim 1, wherein the access signal is a wireless access signal.

12. The computer-implemented method of claim 1 further comprising:
increasing a power of the jamming radio signal in response to sensing an increase in power of the interrogation signal.

13. A system comprising:
a key locker comprising:
a key locker body sized to store a vehicle key including a radio-frequency identification (RFID) tag; and
a jamming radio configured to selectively output a jamming radio signal that interferes with an interrogation signal emitted by a vehicle to verify the RFID tag of the vehicle key; and
processing logic configured to receive an access signal, wherein the processing logic is configured to selectively deactivate the jamming radio from outputting the jamming radio signal when access data of the access signal matches an access code, wherein halting the output of the jamming radio signal allows the interrogation signal emitted by the vehicle to authenticate the RFID tag of the vehicle key to provide access to the vehicle.

14. The system of claim 13, wherein the processing logic is further configured to:
receive an access indicator indicative of a user attempting to access the vehicle; and
activate the jamming radio to output the jamming radio signal in response to receiving the access indicator.

15. The system of claim 14, wherein the access indicator is at least one of an analog electrical signal or a digital message, and wherein the access indicator is generated in response to (1) the user engaging a door handle or door lock of the vehicle; or (2) the user engaging a starting interface of the vehicle.

16. The system of claim 14, wherein the processing logic is further configured to activate the jamming radio to output the jamming radio signal after a pre-determined time period since selectively deactivating the jamming radio.

17. The system of claim 14, wherein the access indicator is received from a Controller Area Network (CAN) bus.

18. The system of claim 13, wherein the key locker further includes a key locker door configured to shield the RFID tag of the vehicle key from receiving the interrogation signal from the vehicle or transmitting radio signals outside the key locker body when the key locker door is closed, wherein the processing logic is further configured to open the key locker door when the access data of the access signal matches the access code.

19. The system of claim 13 further comprising:
a wireless interface configured to receive the access signal, wherein the access signal is a wireless access signal.

20. A computer-implemented method of controlling access to a vehicle, the computer-implemented method comprising:
receiving an access indicator indicative of a user attempting to access the vehicle;
outputting a jamming radio signal in response to receiving the access indicator, wherein the jamming radio signal is configured to interfere with an interrogation signal emitted by a vehicle for verifying a tag of a vehicle key that provides access to the vehicle;

receiving an access signal;

determining whether the access signal includes access data that matches an access code; and pausing the output of the jamming radio signal when the access data of the access signal matches the access code, wherein halting the output of the jamming radio signal allows the interrogation signal to authenticate the tag of the vehicle key to provide access to the vehicle.

\* \* \* \* \*